106. COMPOSITIONS, COATING OR PLASTIC

89

Cross Reference 931,884 Examiner

UNITED STATES PATENT OFFICE.

CHARLES McCORMICK, OF ST. LOUIS, MISSOURI, ASSIGNOR TO MERAMEC PORTLAND CEMENT & MATERIAL COMPANY, OF PHOENIX, ARIZONA TERRITORY, A CORPORATION OF ARIZONA TERRITORY.

WATERPROOF PORTLAND CEMENT AND PROCESS OF MAKING SAME.

931,884.      Specification of Letters Patent.      Patented Aug. 24, 1909.

No Drawing.      Application filed September 14, 1908.    Serial No. 452,823.

*To all whom it may concern:*

Be it known that I, CHARLES McCORMICK, a citizen of the United States, residing at the city of St. Louis, State of Missouri, have invented certain new and useful Improvements in Waterproof Portland Cement and Process of Making Same, of which the following is a specification, reference being had therein to the accompanying drawings.

This invention consists in a waterproof Portland cement which, when made into a mortar or concrete and allowed to set, is permanently impervious to water, and it consists, also, in a process of rendering Portland cement waterproof.

Various methods have heretofore been proposed for rendering mortar and concrete made of Portland cement waterproof, but all these methods have proven to be more or less unsatisfactory, since, independent of any question of their efficiency in waterproofing, it is necessary in practicing them to add the waterproofing ingredients to the mix (of cement, water, sand, etc.) at the time that the mortar or concrete is made. According to some methods, these waterproofing ingredients are added to the whole mix, and in others the waterproofing ingredients are added only to that part of the mix which is to be used for external or finished surfaces. In any event, however, great skill is required in making the mix when said prior processes are practiced, and, if the best results are to be secured, the mixing of the mortar can not be intrusted entirely to ordinary workmen, but must be in charge of a person who has some knowledge of the chemical reactions involved. The cement which is hereinafter described, however, is produced at the Portland cement works and placed upon the market in such form that, when made into mortar or concrete in the ordinary way (*i. e.*, by the addition of water, sand, and aggregate), the mortar or concrete will be impervious to moisture.

Generically, the invention consists in introducing into the cement (1) a filler and (2) a vehicle which will carry the filler and diffuse same throughout the entire body of cement when the cement is in a semi-liquid or plastic condition, which vehicle, also, itself serves as a filler.

More specifically, the invention consists in introducing into the cement in the dry state certain substances which will, so long as the cement remains dry, preserve their identity and undergo no chemical reaction, however, in the presence of water, be so changed either physically or chemically as to provide both the filler and the vehicle.

The vehicle to be provided should be a colloidal substance which will readily penetrate the cement and diffuse itself throughout the entire mass, entering into and filling up all the pores and voids (even the smallest) in the mortar or concrete which the cement has been used to make. The vehicle must, also, be one which will readily carry whatever filler is provided, so as to deposit the particles of filler within the pores and voids in the cement. The filler should be a substance or substances possessing such fineness and water-repelling qualities that, when associated with the vehicle, the filler will give greater body to the whole void-filling mass and insure complete and permanent impermeability in the resulting concrete when set.

Any substance which will answer the requirements set forth in the two preceding paragraphs of this specification can be used. The following ingredients are recommended, however, because they have proven to be thoroughly satisfactory in every respect.

(1) The vehicle is produced by introducing into the cement proper quantities of calcium hydroxid and aluminum sulfate. These, in the presence of water, react quickly, resulting in the formation of a copious colloidal or jelly-like precipitate of aluminum hydroxid. The calcium hydroxid must be reasonably free from carbonates, though not necessarily chemically pure. Any other substances which will produce sufficient quantities of colloidal precipitates may be used, and other sulfates (like ferrous sulfate) may be substituted for all or part of the aluminum sulfate. Aluminum sulfate is preferable, however, both because the resulting precipitate of aluminum hydroxid serves admirably as a vehicle, and because it is practically colorless, and, therefore, does not communicate to the mortar or concrete the dirty green tinge that would follow from the use of iron salts.

(2) The filler comprises (*a*) a main filler, such as dry clay of plastic properties, talc, soapstone, or similar silicate mineral with or without fine silica, reasonably free from carbonates, and in an extremely fine state of division; and (*b*) a relatively small amount of some metallic salt of a fatty acid, such, for instance, as stearate of zinc. Finely ground silica, talc, or other silicate materials may be substituted for part or all of the clay.

When the ingredients enumerated above are used, the proportion of each to be taken and the method of mixing them together and with the Portland cement are as follows: Fourteen (14) parts of aluminum sulfate, five (5) parts of dry calcium hydroxid reasonably free from carbonate, eleven (11) parts of any fine dry clay of plastic properties, and two (2) parts of zinc stearate are taken and mixed together. The mixture thus obtained (preferably in pulverulent condition) is added to the Portland cement in the proportion of nine and one-half (9½) pounds of the mixture to three hundred and seventy and one-half (370½) pounds of dry cement, or approximately one part of the waterproofing ingredients to thirty-nine parts of cement, and thoroughly incorporated therewith by mechanical mixture. It is preferable that the said waterproofing ingredients be mixed together before being added to the cement, in order to make it more certain that the mixture of ingredients in their proper proportions will be uniformly disseminated throughout the mass of cement, but they may, however, be added one at a time to the cement. The ingredients, whether mixed with the cement singly, or all at the same time, are added to the cement either during the grinding of the clinker or to the finished cement after it has been ground, or in any way to insure thorough and uniform dissemination throughout the cement. It is entirely feasible, of course, to add the waterproofing ingredients to the Portland cement at the time of making the mortar or concrete, but it is preferable to make the mixture at the factory, since then the product is placed upon the market in such form that an ordinary workman who has had average experience in the building trades can handle the cement and make the mix by following a course of procedure with which he is perfectly familiar, and without requiring special directions about his work.

The quantity of calcium hydroxid mentioned hereinabove slightly exceeds the precise amount required to produce the maximum colloidal precipitate of aluminum hydroxid, four and two-thirds (4⅔) parts of calcium hydroxid being just sufficient for the reaction with fourteen (14) parts of aluminum sulfate, thus leaving an excess of one-third (⅓) of one (1) part of the five (5) parts of calcium hydroxid. This excess, however, is desirable, in order to render it certain that all the aluminum will be precipitated as hydroxid.

After having been mixed with the waterproofing ingredients, the cement is ready for use at any time, and it is made into mortar or concrete by exactly the same means that are employed when ordinary Portland cement is used. It is unnecessary to take any precautions or to perform any steps which are not required with ordinary Portland cement; hence, the expense, care, and labor involved in making concrete or mortar with the hereindescribed waterproof cement is exactly the same as that required for making mortar or concrete with ordinary cement.

The entire amount of waterproofing material need not in any case exceed two and a half to three per cent. of the combined mixture of the Portland cement and waterproofing ingredients. The character of the component ingredients is such, and their proportion to the entire volume is so small, that there is no deleterious effect whatsoever upon the Portland cement, and the presence of the waterproofing substances in the cement impairs neither the keeping qualities of the cement before use nor its efficiency when made into mortar or concrete. On the contrary, in addition to making the set concrete permanently impervious to water, these waterproofing ingredients act to some extent as a retarder, thus tending to obviate the necessity for adding gypsum, plaster-of-paris, or similar substance to the cement, in order to retard or delay the initial set of the cement when made into mortar, as is now done universally.

This invention, therefore, marks a distinct and very important advance in the art, and results in the production of an article possessing a far greater degree of utility and a much wider range of application than any cement heretofore known.

Having thus described my said invention, what I claim and desire to secure by Letters-Patent is:

1. A process of making a water-proof Portland cement which consists in mixing with the dry raw cement ingredients in a dry mixed state which will form a colloidal hydroxid compound adapted to permeate the mass when rendered plastic.

2. A process for making a water-proof cement which consists in mixing with the dry Portland cement a sulfate and an alkaline base which will displace the base of the sulfate and form a colloidal precipitate with the addition of water.

3. A process of rendering Portland cement water-proof which consists in mixing therewith a compound comprising a sulfate or sulfates and an alkaline base which is adapted to form a colloidal precipitate with said sulfate or sulfates and permeate said cement.

4. A process of rendering cement waterproof, which consists in mixing with the cement a plurality of dry substances which, when the cement is treated with water, will form a colloidal precipitate which will permeate the cement mass.

5. A process of rendering cement waterproof which consists in mixing with the cement a compound comprising a filler, a sulfate or sulfates, and an alkaline base which will form with said sulfate or sulfates a colloidal precipitate.

6. A process of rendering cement waterproof, which consists in mixing with the cement a clay of plastic qualities, a metallic salt of one of the fatty acids, and substances which, when the cement is treated with water, form a colloidal precipitate which will permeate the mass to render it impermeable when set.

7. A process of rendering cement waterproof, which consists in mixing the cement with a compound comprising a silicate mineral, a metallic salt of one of the fatty acids, a sulfate or sulfates, and an alkaline base which will form with said sulfate or sulfates a colloidal compound and precipitate.

8. A water-proofing compound for a Portland cement which comprises a clay of plastic properties, a sulfate or sulfates, and an alkaline base which will react with said sulfate or sulfates to form a colloidal precipitate when treated.

9. A water-proofing compound for a cement comprising a clay or mineral silicate of plastic properties, aluminum sulfate, and an alkaline base.

10. A cement comprising Portland cement and water-proofing ingredients in the respective proportions of thirty-nine to one, said ingredients comprising fourteen parts aluminum sulfate, eleven parts clay of plastic qualities, and five parts of calcium hydroxid.

11. A cement comprising Portland cement and water-proofing ingredients, in the respective proportions of thirty-nine to one, said ingredients comprising fourteen parts aluminum sulfate, eleven parts clay of plastic qualities, two parts zinc-stearate, and five parts calcium hydroxid, said ingredients being adapted when treated to form a colloidal compound which will permeate the cement mass.

12. A waterproofing compound for cements consisting of aluminum sulfate, calcium hydroxid, zinc stearate, and a clay filler, said aluminum sulfate and calcium hydroxid being adapted to form a colloidal precipitate which will permeate a plastic cement mass.

In testimony whereof I have affixed my signature in presence of two witnesses.

CHARLES McCORMICK.

Witnesses:
GLADYS WALTON,
EDNA J. GOCKEL.